May 3, 1960 B. K. EVERETTS 2,935,006
REMOTE SHUTTER TRIPPING DEVICE
Filed June 9, 1958
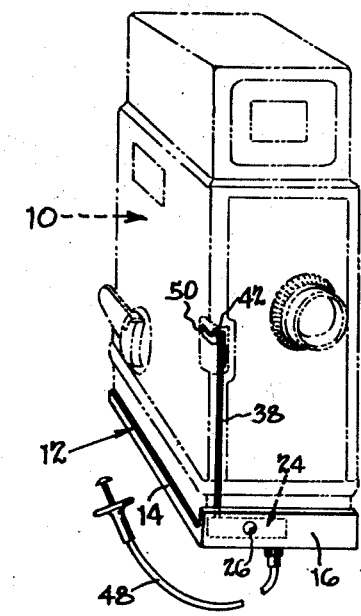
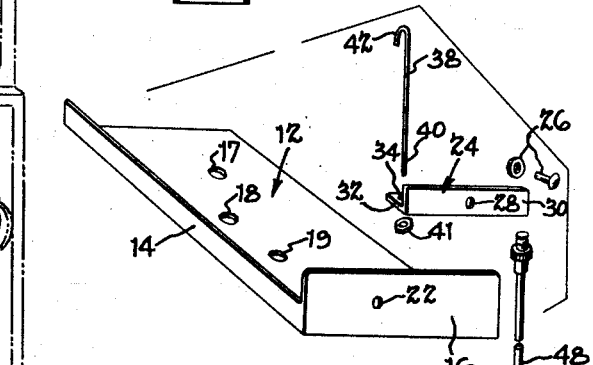
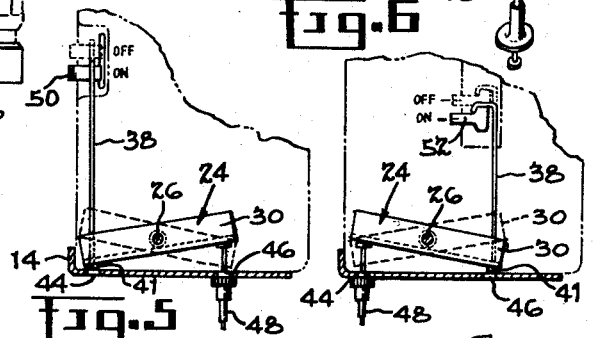
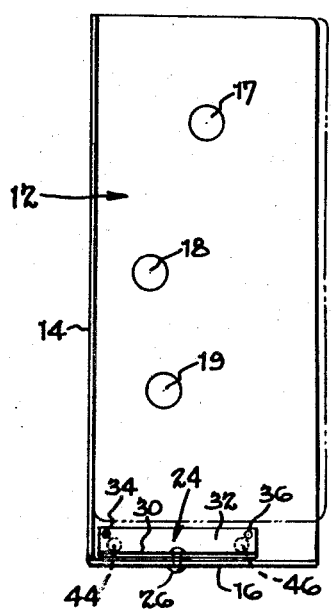
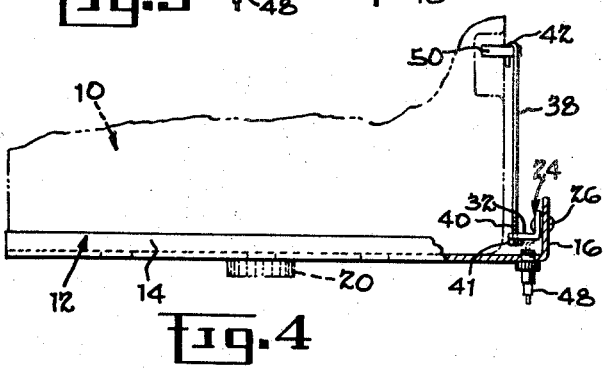
INVENTOR.
BLAINE K. EVERETTS.
BY
Wood, Herron & Evans.
ATTORNEYS.

United States Patent Office 2,935,006
Patented May 3, 1960

2,935,006

REMOTE SHUTTER TRIPPING DEVICE

Blaine K. Everetts, Columbus, Ohio

Application June 9, 1958, Serial No. 740,691

6 Claims. (Cl. 95—86)

This invention relates to an adaptor for connecting a cable release to the trigger of a moving picture camera not already provided with a cable releasing connection; and more particularly the invention relates to an adaptor which may be used with more than one type of camera.

It has been an objective of the invention to provide an adaptor which is easily and economically manufactured, the adaptor being constructed only of three elements.

It has been another objective of the invention to provide an adaptor which can quickly and easily be attached to and removed from standard makes of cameras.

It has been another objective of the invention to provide an inexpensive adaptor which has a certain degree of universality in that it is usable with camera having triggers mounted on the front center, front left and left side.

It has been still another objective of the invention to provide a cable release adaptor comprising a base plate attachable to a camera, a lever pivotally mounted at its center to the base plate and means for attaching a trigger engaging hook on either side of the lever. The base plate is adapted to receive a cable release adjacent either end of the lever. When the hook is attached to the one end of the lever, the cable release will be attached to the base plate so as to engage the other end of the lever to pivot the lever about its pivot point thereby causing the hook to pull on the camera trigger.

It is another objective of the invention to provide a camera mount and trigger device which is adapted for use on a light bar for taking indoor movies, thereby minimizing the possibility of burned fingers arising from operating the camera in close proximity to the flood lights.

These and other objects of the invention will become more readily apparent from the following detailed description taken in conjunction with the drawings.

Fig. 1 is a perspective view of the invention.

Fig. 2 is an exploded view in perspective showing the invention.

Fig. 3 is a top plan view of the invention.

Fig. 4 is a side elevational view partly in section of the invention.

Figs. 5 and 6 are front elevational views partly in section showing the adaptor with different types of cameras.

In the drawings the camera, which forms no part of the invention, is shown in broken lines. The camera, indicated at 10, is mounted on a base plate 12 having a side flange 14 and a front flange 16.

The base plate 12 is provided with three holes 17, 18 and 19 through which a clamping screw 20 (Fig. 4) may pass in order to attach the camera to the base plate. Alternatively, the threaded end of a tripod could pass through one of the holes 17—19 and secure the base plate between the bottom of the camera and the tripod. Still further the base plate can be clamped between a light bar and the bottom of a camera.

Hole 22 is formed in the flange 16 for pivotally mounting a lever 24 by means of a rivet or nut and bolt 26. The lever 24 is L-shaped having a hole 28 in vertical leg 30 through which the bolt passes. A horizontal leg 32 has two holes 34 and 36 (Fig. 3) therein through which a hook 38 having a threaded end 40 loosely passes. A nut 41 on the threaded end 40 permits a force applied to the lever 24 to be transmitted to the hook 38. The loose fitting of the hook and holes avoids bending the hook 38 as lever 24 is pivoted. Instead of the nut 41 a small L-shaped bend could be made in the end 40 of the hook to effect the same result. The other end 42 of the hook is bent to engage a trigger on a camera as will be described below.

The base plate has a hole 44 beneath one end of the lever 24 and a hole 46 beneath the other end of the lever as best shown in Figs. 3, 5 and 6. The holes 44 and 46 are threaded to receive a standard cable release 48.

The operation of the invention will be understood by references to Figs. 1, 5 and 6. The camera 10 is fastened to the base plate 12. The camera of Figs. 1 and 5 has a trigger mounted on the left side thereof and accordingly the hook 38 will be threaded into the corresponding hole 34 and hooked over the trigger 50 of the camera. The cable release 48 will be threaded in the hole 46 which is adjacent the end of the lever remote from the hole 34. The operation of the camera is shown in Fig. 5. When the cable release button is depressed the cable release drives the lever 24 counter clockwise causing the hook 38 to pull the trigger 50 from "off" to "on" position. Release of the button on the cable release 48 permits a spring mechanism associated with the camera trigger to pull the trigger back to "off" position thereby returning the lever 24 to the normal position shown in the dotted lines in Fig. 5.

For the camera which has its trigger on the front center portion of the camera, the adaptor is connected as shown in Fig. 6, and the cable release 48 is connected to the hole 44 at the left side of the camera and the hook 38 is threaded in hole 36 at the right side of the lever 24 to engage a trigger 52. Depressing the cable release button causes clockwise rotation of the lever 24 about its central pivot thereby causing the hook 38 to pull the trigger from "off" to "on" position. Release of the button on the cable release permits the spring actuated trigger 52 to restore the lever 24 to the normal position shown in the dotted lines.

It is to be understood that hooks of varying lengths may be required for cameras having different positions of their triggers with respect to the base plate. The mechanism may therefor be sold with hooks having lengths varying in accordance with differing camera types so that the proper length hook can be selected. It should also be understood that the lever may be pivotally mounted on the side flange 14, should it be necessary to operate a trigger on the side center of the camera, and such change would not depart from the scope of the present invention.

Having described my invention, I claim:

1. A camera mount and remote shutter tripping device comprising, a base plate, means for mounting cameras having different trigger positions on said plate, a flange projecting upwardly from said plate at the front portion thereof, a lever, means pivoting said lever intermediate the ends thereof to said flange, said plate having a cable release receiving socket located under each end of said lever whereby actuation of a cable release secured in one of said sockets will cause the end of said lever to be engaged for upward movement about said pivot, said lever having a hook receiving socket at each end thereof, and a hook mounted in the hook receiving socket remote from the socket in which said cable release is received, said hook having a camera trigger engaging portion at one end thereof, whereby pivoting of said lever will cause said hook to operate a camera trigger.

2. A camera mount and remote shutter tripping device comprising, a base plate, means for mounting cameras having different trigger positions on said plate, a lever mount projecting upwardly from said plate at the front portion thereof, a lever, means pivoting said lever intermediate the ends thereof to said lever mount, said plate having a cable release receiving socket located under each end of said lever whereby actuation of a cable release secured in one of said sockets will cause the end of said lever to be engaged for upward movement about said pivot, said lever having a hook receiving socket at each end thereof, and a hook mounted in the hook receiving socket remote from the socket in which said cable release is received, said hook having a camera trigger engaging portion at one end thereof, whereby pivoting of said lever will cause said hook to operate a camera trigger.

3. A camera mount and remote shutter tripping device comprising, a base plate, means for mounting cameras having different trigger positions on said plate, a lever, means pivotally mounting said lever intermediate the ends thereof to said plate to pivot said lever in a plane generally perpendicular to said plate, said plate having a cable release receiving socket located under each end of said lever whereby actuation of a cable release secured in one of said sockets will cause the end of said lever to be engaged for upward movement about said pivot, said lever having a hook receiving socket at each end thereof, and a hook mounted in the hook receiving socket remote from the socket in which said cable release is received, said hook having a camera trigger engaging portion at one end thereof, whereby pivoting of said lever will cause said hook to operate a camera trigger.

4. A camera mount and remote shutter tripping device comprising, a base plate, means for mounting cameras having different trigger positions on said plate, a flange projecting upwardly from said plate at the front portion thereof, a lever, means pivoting said lever intermediate the ends thereof to said flange with the outer end of said lever adjacent the edge of said plate, said plate having a cable release receiving socket located under each end of said lever whereby actuation of a cable release secured in one of said sockets will cause the end of said lever to be engaged for upward movement about said pivot, said lever having a hook receiving socket at each end thereof, and a hook mounted in the hook receiving socket remote from the socket in which said cable release is received, said hook having a camera trigger engaging portion at one end thereof, whereby pivoting of said lever will cause said hook to operate a camera trigger.

5. A cable release adaptor for at least two moving picture cameras having differing trigger positions comprising, a base, means for connecting said base to the bottom of a camera, a lever pivotally mounted intermediate the ends thereof on said base, means on said base for selectively fastening a cable release adjacent each end of said lever, said cable release, when in fastened position being engageable with said lever to pivot said lever, a hook having one end engaging a camera trigger, and means for fastening the other end of said hook to the end of said lever remote from said cable release.

6. A cable release adapter for at least two moving picture cameras having differing trigger positions comprising, a base, an upwardly projecting side positioning flange on said base, means for connecting said base to the bottom of a camera with the lower edge of said camera in engagement with said flange, a lever pivotally mounted intermediate the ends thereof on said base, means on said base for selectively fastening a cable release adjacent each end of said lever, said cable release, when in fastened position being engageable with said lever to pivot said lever, a hook having one end engaging a camera trigger, and means for fastening the other end of said hook to the end of said lever remote from said cable release.

References Cited in the file of this patent
UNITED STATES PATENTS

| | | |
|---|---|---|
| 2,793,573 | Cuchet | May 28, 1957 |
| 2,830,514 | Brooks | Apr. 15, 1958 |